Oct. 20, 1970  JAMES E. WEBB  3,535,554
ADMINISTRATOR OF THE NATIONAL AERONAUTICS
AND SPACE ADMINISTRATION
BOOTSTRAP UNLOADER
Filed Jan. 17, 1968
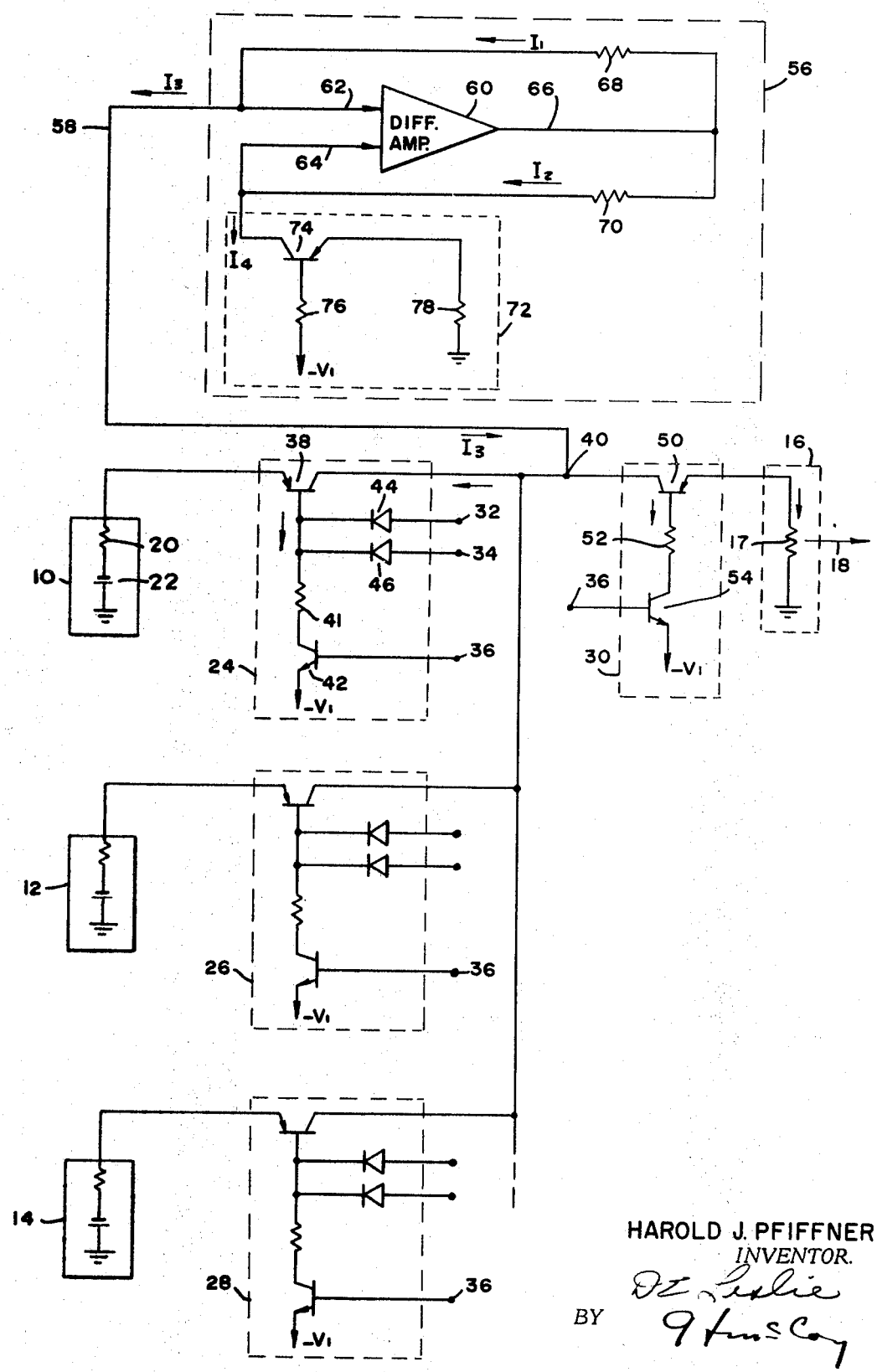
HAROLD J. PFIFFNER
INVENTOR.
BY
ATTORNEYS.

United States Patent Office 3,535,554
Patented Oct. 20, 1970

3,535,554
BOOTSTRAP UNLOADER
James E. Webb, Administrator of the National Aeronautics and Space Administration, with respect to an invention of Harold J. Pfiffner, Los Angeles, Calif.
Filed Jan. 17, 1968, Ser. No. 698,629
Int. Cl. H03k 17/00
U.S. Cl. 307—243
10 Claims

ABSTRACT OF THE DISCLOSURE

A circuit for sampling a number of transducers in sequence without drawing current from them comprising a separate processing switch for each transducer, and a differential amplifier with one input connected to the outputs of all of the processing switches, another input connected to an equivalent circuit which draws as much current as any one of the processing switches when it is on, and feedback loops connecting the differential amplifier output to its two inputs.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to unloading circuits for enabling the sampling of voltages without drawing current.

It is often necessary to sample voltage outputs from such devices as transducers without drawing current therefrom, inasmuch as the drawing of current from high impedance transducers or other sources may detrimentally affect them. However, many of the simplest and most reliable processing circuits, often using transistor-like devices, require appreciable current inputs. In order to provide appreciable current flow from the circuit which samples the transducers or other voltage inputs, without loading them, negative resistance devices have been proposed. One example of such a device is a transistor connected in an emitter follower configuration with a feedback loop to provide a current from the input which unloads the voltage source. However, it has been difficult to match the unloader circuit accurately to the switching circuits which pass the voltage inputs, so as to accurately unload the voltage source. Furthermore, the circuits proposed heretofore were very sensitive to changes in power supply voltages.

It is an important object of this invention to provide a circuit for sampling any one of a number of transducers, and to provide an appreciable output current for each sample without drawing current from the transducer; this is accomplished for a wide range of transducer voltages, and for large variations in temperatures and power supply voltages.

SUMMARY OF THE INVENTION

In accordance with the present invention, there is provided a circuit for sampling voltage sources without drawing currents from them. The circuit comprises sampling or processing switches for passing the voltages from the transducers or other voltage sources being sampled to a sampling junction, with one switch being on at a time. A differential amplifier is provided which has a first input connected to the sampling junction. The differential amplifier supplies a current through its first input to the sampling junction, and the current then flows to the sampling switch which is on. This current to the sampling switch is equal to the current which would otherwise be drawn from the transducer voltage source. A second input of the differential amplifier is connected to an equivalent circuit having the same impedance characteristics as each of the sampling switches plus any other circuitry connected to the sampling junction. A feedback loop connected between the output of the differential amplifier and its two inputs assures that the same amount of current which is drawn by the equivalent circuit is delivered to the sampling junction. Accordingly, the amount of current which must flow through the sampling switch which is on in order to operate it, is supplied by the differential amplifier at all times, rather than the transducer or other voltage source, and the voltage output of the transducer is not affected by the sampling.

A better understanding of the invention may be had by considering the following specification and claims, when taken in conjunction with the accompanying drawings.

BRIEF DESCRIPTION OF THE DRAWING

The figure is a schematic diagram of an embodiment of the invention.

DESCRIPTION OF THE PREFERRED EMBODIMENTS

The schematic diagram of the figure illustrates a circuit for sampling any one of a number of voltage sources, such as those indicated at 10, 12 and 14, which represent transducers. The circuit provides currents to a processing circuit indicated at 16, which may be an analogue-to-digital converter providing an output at 18 indicating the voltage level of the particular transducer being sampled. Each of the transducers, like many other voltage sources, has an output characteristic which can be represented by a resistor and battery in series, such as the resistor 20 and battery 22 shown within the source represented at 10. The output from each transducer is connected to a sampling or processor switch such as those shown at 24, 26, and 28 for passing the voltage input from one of the sources to a sampling junction 40, and a master switch 30 connected to the junction which passes that sample voltage to the processing circuit 16. The master switch 30 and processing circuit 16 may be considered as additional circuit means for utilizing the signal passed by a processor switch.

Each processor switch, such as switch 24, has three control input terminals 32, 34 and 36, which determine whether the switch is on or off. Only one of the many processor switches will be turned on at one time, so only one voltage sample is delivered at any instant to the sampling junction 40, through the master switch 30 and to the processing circuit 16.

Each processor switch, such as switch 24, comprises a transistor 38 having an emitter connected to the transducer associated with it, such as transducer 10, and a collector connected to the common or sampling junction 40 leading to the master switch. The base of the transistor 38 is connected to a resistor 41 through a switching transistor 42 to a voltage source $-V_1$. Two diodes 44 and 46 are connected between the control input terminals 32 and 34 and the base of the transistor 38. The circuit is constructed so that the transistor 38 is turned on, and can pass its voltage input from transducer 10 to the junction 40, only if a negative voltage appears at two control input terminals 32 and 34, and positive voltage at 36. The input terminal 36 (and similar terminals of the other processor switches) is connected to an on-off switch (not shown) which is turned on only when it is desired to sample at least one of the transducers connected to the common sampling junction 40, and which is otherwise turned off to conserve power. The particular one of the processor switches which is turned on at any one time, so it can pass the voltage of its transducer to junction 40, is governed by which one has a negative voltage at its two diode input terminals, such as input terminals 32 and 34 of switch 24. When switch 24 is on, the voltage from transducer 10 passes to the junction 40.

When the transistor 38 is turned on, an appreciable base current is drawn, which, in the absence of an unloader circuit 56 to be described, would have to be drawn from the transducer 10. Additionally, the master switch 30 has a transistor 50 which requires a base current when it is on and which would have to be supplied by the transducer being sampled in the absence of the unloader circuit 56. The master switch base current flows through resistor 52 and a switching transistor 54. (The switching transistor 54 has a base which is connected to the same source to which all terminals 36 of the processor switches are connected.) The unloader circuit 56 delivers a current from its input line 58 which is just equal to the two base currents drawn by one of the processor switches, such as 24 and the master switch 30, so that essentially zero current is drawn from the transducer being sampled, and its voltage output is not appreciably affected.

The unloading circuit 56 comprises a differential amplifier 60 having first and second inputs 62 and 64 and an output 66. A differential amplifier is characteried by extremely high amplification, so that the voltage difference between the inputs 62 and 64 is extremely small, and nominally zero. The output 66 is connected through a first resistor 68 to the first input 62 and through a second resistor 70 to the second input 64. The resistors 68 and 70 are equal, so that for any output at 66, the same current must flow through both resistors 68 and 70 in order for the input votlages at 62 and 64 to remain equal.

The second input 64 of the differential amplifier is connected to an equivalent circuit comprising a transistor 74 and two resistors 76 and 78. The equivalent circuit 72 is designed to draw as much current as is drawn by a processor switch, such as 24, the master switch 30 and the processing circuit 16. The resistor 76 in the base circuit of transistor 74 has a resistance equal to the parallel resistance of resistor 41 of a processor switch and resistor 52 of the master switch 30, so that as much current flows through resistor 76 as flows through the two resistors 41 and 52. The resistor 78 connected to the emitter of transistor 74 has the same resistance as the equivalent resistance 17 of the processing circuit 16. Accordingly, the current drawn by the equivalent circuit 72 is equal to the total current flowing out of the junction 40 and into the base of a processor switch, such as switch 24, the master switch 30 and the processing circuit 16. The purpose of the unloader circuit 56 is to provide as much current from its input 58 into the junction 40 as is drawn out of the junction, since such current would otherwise have to be supplied by the transducer being sampled.

In the unloader circuit 56, the current output from the differential amplifier 60 divides equally between a first current $I_1$ through resistor 68 and a second current $I_2$ through resistor 70, as pointed out above. The current flowing to each input 62 and 64 of the differential amplifier is always equal in the steady state. Accordingly, the current $I_3$ (which equals $I_1$ minus the current into input 62), which flows into the junction 40 is equal to the current $I_4$ (which equals $I_2$ minus the current into input 64), which flows into the equivalent circuit 72.

The current $I_4$ through the equivalent circuit 72 is equal to the base current drawn by the transistors 38 and 50 of a processor switch and the master switch, plus the current flowing through the equivalent resistance 17 of the processor circuit 16. Accordingly, the current $I_3$ is also equal to the total current drawn by the processor switch 24, master switch 30 and processing circuit 16. The current $I_3$ from the unloader circuit flows into the junction 40, while the currents to the processor switch 24 and the master switch 30 flow in a direction away from the junction 40. In the processor switch 24, the base current of transistor 38 is equal to the collector current flowing from junction 40, therefore no current flows through the emitter of transistor 38 and the transducer 10 supplies no current output. When the transistor 38 is turned on (by reason of the current flow through its base), the voltage from transducer 10 is passed through transistor 38 to the junction 40, and through transistor 50 to the processing circuit 16.

Thus, the unloader circuit 56 establishes an equivalent circuit 72 drawing as much current as would otherwise be drawn from the voltage source being sampled, and utilizes a differential amplifier circuit which provides a current equal to that drawn by the equivalent circuit. The current supplied to the sampling circuit junction 40 is of the proper amount, regardless of changes of temperature, power supply voltage, and the like, since such changes affect the equivalent circuit in generally the same manner as the sampling circuit. For example, changes in the voltage supply $-V_1$ or in transistor characteristics due to temperature variations affect both circuits in a similar manner. As a result, the unloading effect is always maintained at the proper level, and the transducer or other voltage source is accurately sampled for a wide range of sampling voltages.

While a particular embodiment of the invention has been illustrated and described, it should be understood that many modifications and variations may be resorted to by those skilled in the art, and the scope of the invention is limited only by a just interpretation of the following claims.

What is claimed is:

1. An unloader circuit for unloading another circuit comprising:

equivalent circuit means for drawing the same current as is drawn by said circuit to be unloaded; and means having first and second outputs for delivering first and second currents, respectively, of equal magnitude, said first output coupled to said equivalent circuit means and said second output coupled to said circuit to be unloaded.

2. An unloader circuit as defined in claim 1 wherein:

said circuit to be unloaded comprises a transistor connected in a predetermined configuration; and said equivalent circuit means comprises a transistor connected in a manner similar to the connection of said transistor in said circuit to be unloaded, whereby to allow changes in transistor characteristics to affect two circuits in a similar manner.

3. An unloader circuit for unloading another circuit comprising:

equivalent circuit means for drawing the same current as is drawn by said circuit to be unloaded; and differential amplifier means having a first input connected to said circuit to be unloaded, a second input connected to said equivalent circuit means, an output, first resistance means connecting said output to said first input, said second resistance means connecting said output to said second input, said first and second resistance means having the same resistance values.

4. An unloader circuit for unloading another circuit of predetermined characteristics comprising:

differential amplifier means having first and second inputs and an output;

an equivalent circuit having an input for drawing the same current as is drawn by said circuit to be unloaded;

means connecting said circuit to be unloaded to said first input of said differential amplifier means;

means connecting said input of said equivalent circuit to said second input of said differential amplifier means;

means connecting said output of said differential amplifier means to said first input thereof; and means connecting said output of said differential amplifier means to said second input thereof, having the same impedance characteristics as said means connecting saaid output of said differential amplifier means to said first input thereof.

5. An unloader circuit as defined in claim 4 wherein: said circuit to be unloaded comprises a plurality of transistors having base circuits with predetermined resistance; and said equivalent circuit comprises a transistor having a base circuit with a resistance approximately equal to the parallel resistance of the resistances in the base circuits of said transistors of said circuit to be unloaded.

6. An unloader circuit as defined in claim 4 wherein: said means connecting said output of said differential amplifier means to said first input thereof and said means connecting said output of said differential amplifier means to said second input thereof each are resistors of the same resistances.

7. A sampling circuit comprising:
a plurality of processor switch means, each having an input for connection to a voltage source to be sampled and an output;
common junction means connected to said outputs of all of said processor switch means;
additional circuit means having an input connected to said common junction means for utilizing voltages appearing at said junction means;
differential amplifier means having a first input connected to said common junction means, a second input, and an output;
equivalent circuit means connected to said second input of said amplifier means, having an input impedance for drawing the same amount of current as is drawn from said common junction by said additional circuit means and a predetermined number of said processor switch means;
first resistance means connected between said output of said differential amplifier means and said first input thereof; and
second resistance means having the same resistance as said first resistance means, connected between said output of said differential amplifier means and said second input thereof.

8. A sampling circuit as defined in claim 7 wherein:
each of said processor switch means comprises a transistor having an emitter-to-collector junction connected between said input and said output of said switch means, and a base circuit having a predetermined base resistance;
said additional circuit means comprises a series resistor means, and a transistor means having a predetermined base resistance and an emitter-to-collector junction connected between said series resistor means and said common junction; and
said equivalent circuit comprises a counterpart resistor means having a resistance approximately equal to the resistance of said series resistor means of said additional circuit, and a transistor having an emitter-to-collector junction connected between said counterpart resistor means and said second terminal of said differential amplifier means and having a base resistance equal to the equivalent parallel resistance of the base resistance of the transistor of one of said processor switch means and of the base resistance of the transistor means of said additional circuit means.

9. A sampling circuit comprising:

a plurality of input terminals for connection to a plurality of voltage sources;
processing switch means including a common junction, said switch means connected to each of said input terminals for selectively passing the voltage input thereto to said common junction;
master switch means having an input connected to said common junction, and an output;
processing circuit means connected to said output of said master switch means;
differential amplifier means having a first input, and an output, for maintaining a nominally zero voltage difference between said first and second inputs thereof and a voltage at said output equal to the highly amplified actual difference between the voltages at said first and second inputs thereto;
equivalent circuit means connected to said second input of said differential amplifier means for drawing as much current as is drawn from said common junction by one of said processing switch means and by said master switch means, including the current delivered to said processing circuit means;
first resistance means connected between said output of said differential amplifier means and said first input thereto; and
second resistance means having a resistance equal to said first resistance means, connected between said output of said differential amplifier and said second input thereto.

10. A sampling circuit as defined in claim 9 wherein:
said processing switch means comprises a plurality of transistors, each having an emitter-to-collector junction area connected between an input to said processing switch means and said common junction, and each having a base circuit with predetermined resistance;
said master switch means comprises a transistor having an emitter-to-collector junction area connected between said common junction and said processing circuit means and a base circuit having predetermined base resistance;
said processing circuit means has a predetermined input resistance; and
said equivalent circuit means comprises a first resistor having a resistance equal to the input resistance of said processing circuit means, a transistor having an emitter-to-collector junction area connected between said second input of said differential amplifier means and said first resistor, and a second resistor connected in the base circuit of said transistor and having a resistance approximately equal to the equivalent parallel resistances of said base circuits of one of said processor switches and said master switch.

References Cited

UNITED STATES PATENTS 3,171,044  2/1965  Coffey _____ 307—243 X

DONALD D. FORRER, Primary Examiner

B. P. DAVIS, Assistant Examiner

U.S. Cl. X.R.

307—254, 264; 328—104; 330—30